（12）United States Patent
Thilmony et al.

(10) Patent No.: US 8,180,734 B1
(45) Date of Patent: May 15, 2012

(54) PRIORITIZATION OF BACKUP TASKS IN A GLOBAL DE-DUPLICATION BACKUP SYSTEM

(75) Inventors: Duane David Thilmony, Savage, MN (US); Nicholas G. Nelson, Champlin, MN (US)

(73) Assignee: Symantec Corporation, Mountain View, CA (US)

( * ) Notice: Subject to any disclaimer, the term of this patent is extended or adjusted under 35 U.S.C. 154(b) by 540 days.

(21) Appl. No.: 12/391,617

(22) Filed: Feb. 24, 2009

(51) Int. Cl.
*G06F 7/00* (2006.01)
(52) U.S. Cl. .................. 707/640; 707/641; 707/654
(58) Field of Classification Search .................. 707/640
See application file for complete search history.

(56) References Cited

U.S. PATENT DOCUMENTS

| | | | |
|---|---|---|---|
| 7,461,102 B2 | 12/2008 | Derk | |
| 7,539,708 B2 | 5/2009 | Oosaki | |
| 7,546,325 B2 | 6/2009 | Kamei | |
| 7,694,088 B1 | 4/2010 | Bromley | |
| 2006/0190521 A1* | 8/2006 | Kojima | .......... 709/200 |
| 2007/0008884 A1* | 1/2007 | Tang | .......... 370/230 |

OTHER PUBLICATIONS

"WAN Optimization for Dummies", Wiley Publishing Inc., 2009.
"Application Performance Brief: IBM Tivoli Storage Manager Performance", Blue Coat Systems Inc., 2007.
"Druva Phoenix Version 1.2 Administrators Guide", Druva Software Pvt. Ltd.; 2007-2008.

* cited by examiner

*Primary Examiner* — Fazlul Quader
(74) *Attorney, Agent, or Firm* — Meyertons, Hood, Kivlin, Kowert & Goetzel, P.C.; Jason L. Burgess

(57) ABSTRACT

Various embodiments of a system and method for initiating backup tasks to backup data from a plurality of client computer systems are described. The backup tasks may be initiated in an order specified by a ranking of the client computer systems according to their respective network transmission speeds. For example, the backup tasks may be prioritized so that backup tasks for client computer systems with faster transmission speeds are initiated before backup tasks for client computer systems with slower transmission speeds.

16 Claims, 5 Drawing Sheets

PRIORITIZATION OF BACKUP TASKS IN A GLOBAL DE-DUPLICATION BACKUP SYSTEM

BACKGROUND OF THE INVENTION

1. Field of the Invention

This invention relates generally to computer backup software executable to backup data from a plurality of client computer systems to a backup server computer system. More particularly, the invention relates to prioritizing the order in which the client computer systems are backed up.

2. Description of the Related Art

Computer systems generally store information as files organized by a file system. Each file may be stored on a storage device, such as a disk drive, optical drive, or tape drive. It is often necessary to back up files by copying them to another storage device. For example, backup operations may be performed to guard against hardware failure or data loss, to provide a snapshot of files at a particular point in time, or to replicate files for other purposes.

In a networked computing environment, a plurality of client computer systems may each back up files to a backup server computer system. It is possible that an identical file is stored on multiple client computer systems. For example, two or more client computer systems may each store a copy of a file, where the data in each copy is identical. For example, client computer systems that execute the same operating system or the same software applications often have many identical files.

De-duplication techniques can be utilized so that only a single copy of each file is stored on the backup server computer system. For example, for each client computer system that has a copy of a particular file, the backup server computer system may store respective file metadata representing that copy. The portions of file metadata associated with each respective copy of the file may all reference a single instance of the file data (the actual contents of the file). In this way, the backup system can avoid the need to store multiple copies of identical files on the backup server computer system. A storage system which uses de-duplication to store and reference a single instance of data in order to avoid storing multiple copies of identical data is sometimes referred to as a single instance storage system.

De-duplication techniques may also be done at a finer level of granularity than at the file level. For example, large files on the client computer systems may be split into a plurality of segments, and the segments may be individually backed up to the backup server computer system. Before each segment is transmitted to the backup server computer system, the system may first determine whether the segment has already been backed up to and stored on the backup server computer system. If so then the segment may not be transmitted to the backup server computer system. Thus, only a single copy of any given segment may be stored on the backup server computer system, and the single copy may be referenced to represent each instance of the segment found in the files on the client computer systems.

SUMMARY

Various embodiments of a system and method for initiating backup tasks to backup data from a plurality of client computer systems are described herein. According to one embodiment, the method may comprise determine a transmission speed at which each client computer system of the plurality of client computer systems can transmit backup data to a backup server computer system. The method may further comprise ranking the client computer systems according to their respective transmission speeds, and initiating a respective backup task for each client computer system of the plurality of client computer systems. The respective backup task for each client computer system may operate to transmit backup data from the client computer system to the backup server computer system.

Initiating the backup tasks for the plurality of client computer systems may comprise initiating the backup tasks for a first subset of the plurality of client computer systems before initiating the backup tasks for a second subset of the plurality of client computer systems in response to determining that the transmission speeds of the client computer systems in the first subset are faster than the transmission speeds of the client computer systems in the second subset.

BRIEF DESCRIPTION OF THE DRAWINGS

A better understanding of the invention can be obtained when the following detailed description is considered in conjunction with the following drawings, in which.

Figure 1:
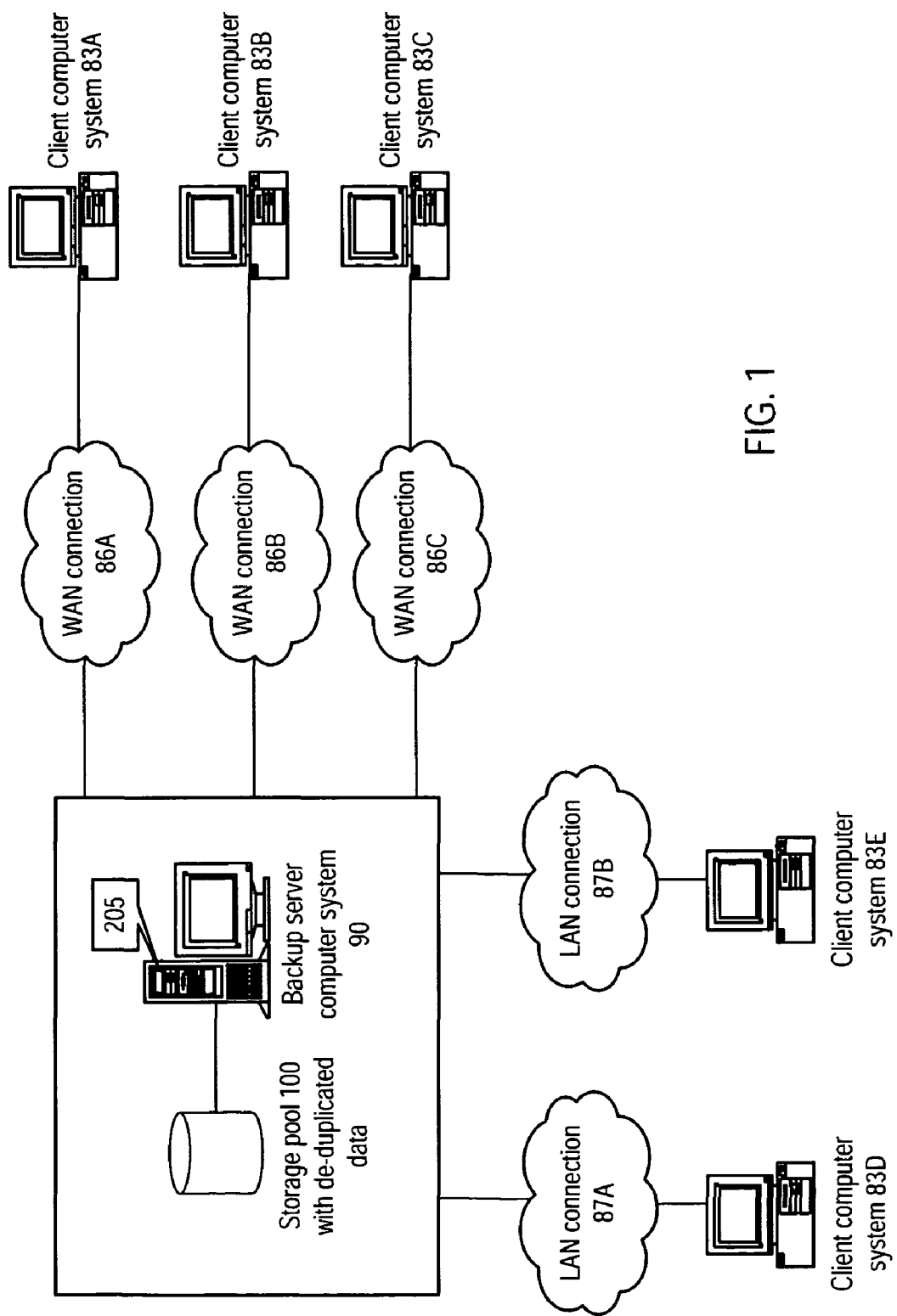
FIG. 1 illustrates one embodiment of a plurality of client computer systems coupled to a backup server computer system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for prioritizing the order in which a plurality of client computer systems are backed up to a backup server computer system are described herein. Data may be backed up from the client computer systems at the file level, or by splitting the files into segments and backing up each segment. The system may utilize de-duplication techniques so that only a single copy of each file or file segment on the client computer systems is stored on the backup server computer system.

The system may operate to determine a transmission speed at which each client computer system can transmit its backup data to the backup server computer system. The client computer systems may then be ranked according to their respective transmission speeds. For each client computer system, a respective backup task may be initiated, where the respective backup task for each client computer system operates to transmit the data to be backed up from the client computer system to the backup server computer system. The backup tasks may be initiated in an order specified by the ranking of the client computer systems according to their respective transmission speeds. For example, the backup tasks may be prioritized so that backup tasks for client computer systems with faster transmission speeds are initiated before backup tasks for client computer systems with slower transmission speeds. As described below, prioritizing the order in which the backup tasks are initiated based on the transmission speeds of the client computer systems may result in a reduction of the amount of time it takes to backup all of the client computer systems to the backup server computer system, and may also decrease network bandwidth usage in some embodiments.

FIG. 1 illustrates one embodiment of a plurality of client computer systems 83 coupled to a backup server computer system 90. Although the system includes five client computer systems 83A-83E in this example, in various embodiments the system may include any number of client computer systems 83. Each client computer system 83 may be coupled to the backup server computer system 90 via a network connection. For example, in some embodiments one or more of the client computer systems 83 may be coupled to the backup server computer system 90 via wide area network (WAN) connections, such as the client computer systems 83A, 83B, and 83C coupled via the respective WAN connections 86A, 86B, and 86C. For example, in some embodiments one or more of the client computer systems 83 may be coupled to the backup server computer system 90 via an Internet connection.

The plurality of client computer system 83 may also or may alternatively include one or more client computer systems 83 coupled to the backup server computer system 90 via local area network (LAN) connections, such as the client computer systems 83D and 83E coupled via the respective LAN connections 87A and 87B.

The backup server computer system 90 may execute server-side backup software 205 operable to communicate with client-side backup software on the client computer systems 83 to backup the data from each client computer system 83. The backup server computer system 90 may implement a storage pool 100 in which the data received from the client computer systems 83 is stored. The data in the storage pool 100 may be de-duplicated so that only a single copy of each file or file segment is stored in the storage pool 100. For example, suppose that a particular file is first backed up from the client computer system 83A and stored in the storage pool 100. If the client computer system 83B has another copy of the same file then the original copy of the file already stored in the storage pool 100 may simply be referenced again instead of storing another copy of the file in the storage pool 100.

Figure 2:
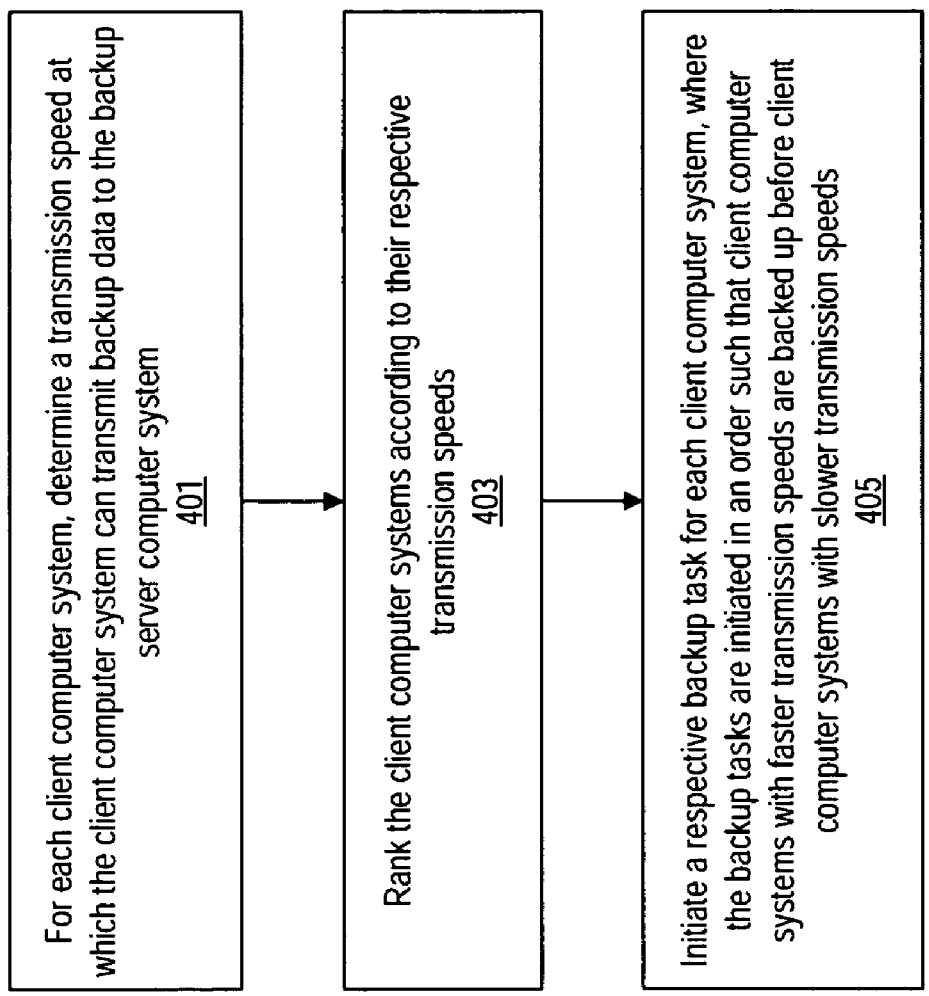
FIG. 2 is a flowchart diagram illustrating one embodiment of a method for backing up the client computer systems to the backup server computer system.

FIG. 2 is a flowchart diagram illustrating one embodiment of a method for backing up the client computer systems 83 to the backup server computer system 90. The method may be implemented by the server-side backup software executing on the backup server computer system 90 and/or the client-side backup software executing on the client computer systems 83.

For each client computer system, a transmission speed at which the client computer system can transmit backup data to the backup server computer system may be determined, as indicated in block 401. In some embodiments, determining the transmission speed at which each client computer system can transmit backup data to the backup server computer system may comprise determining an actual speed of data transmission from the client computer system to the backup server computer system. As one example, the client computer system may transmit one or more data packet messages across a network coupling the client computer system to the backup server computer system, and the amount of time it took for the data packet messages to arrive at the backup server computer system may be determined. For example, the client computer system may transmit the data packet messages to the backup server computer system in response to the backup server computer system polling the client computer system, e.g., in order to request the client computer system to send the data packet messages so that its transmission speed can be determined.

In other embodiments the transmission speed at which a client computer system can transmit backup data to the backup server computer system may be determined without actually measuring the speed of data transmission from the client computer system to the backup server computer system. For example, in some embodiments the backup server computer system may store information indicating the network connection speeds of the client computer systems, and this information may be retrieved to determine the transmission speeds for the client computer systems. In other embodiments the transmission speed at which a client computer system can transmit backup data to the backup server computer system may be estimated based on various factors. For example, the transmission speed for a client computer system may be estimated at a particular time based on current usage of one or more resources of the client computer system at the particular time, e.g., based on current usage of a processor of the client computer system, current memory usage or the amount of available memory (e.g., RAM), etc.

In some embodiments the transmission speeds of the client computer systems 83 may be represented in terms of an amount of data per unit time, such as 500 Kbps, 2 Mbps, etc. In other embodiments the transmission speeds of the client computer systems 83 may be represented as categories. For example, in some embodiments the system may utilize a scale of 1 to 10 to categorize the transmission speed of each client computer system 83. For example, the client computer systems with the fastest transmission speeds may be assigned to category 1 on the scale, and the client computer systems with the slowest transmission speeds may be assigned to category 10 on the scale. Thus, the client computer systems in category 1 are faster than those in category 2, the client computer systems in category 2 are faster than those in category 3, etc.

If a categorization system is used, the client computer systems may be assigned to the categories based on any of various criteria. For example, in some embodiments the client computer systems may be assigned to the categories based on their geographic locations. As an example, in some embodiments there may be hundreds or thousands of client computer systems that are interspersed throughout the world, and each client computer system may be categorized according to its relative distance from the backup server computer system. In general, client computer systems located closer to the backup server computer system may tend to be able to transmit backup data to the backup server computer system faster than those located further away. Thus, the closest client computer systems may be assigned to a category at one end of the scale, and the ones furthest away may be assigned to a category at the other end of the scale. Those located at intermediate distances may be assigned to other categories in between which represent their relative distances from the backup server computer system.

In other embodiments the client computer systems may be assigned to the categories based on the type of their network connection. As one simple example, the system may use two categories to represent the transmission speeds of the client computer systems. For example, client computer systems connected to the backup server computer system via LAN connections may be assigned to a first category, and client computer systems connected to the backup server computer system via WAN connections may be assigned to a second category. The first category may represent a faster transmission speed than the second category since LAN connections are usually faster than WAN connections.

The method may further comprise ranking the client computer systems according to their respective transmission speeds, as indicated in block 403. For example, if the transmission speeds of the client computer systems are represented in terms of an amount of data per unit time (e.g., Kbps, Mbps, etc.) then the transmission speeds may be ordered from fastest to lowest. If the transmission speeds of the client computer systems are represented as categories then the transmission speeds are already effectively ranked. For example, as discussed above, a first category may represent faster data transmission than a second category, and the second category may represent faster data transmission than a third category, etc.

As indicated in block 405, the method may further comprise initiating a respective backup task for each client computer system 83. The respective backup task for each client computer system may operate to transmit backup data from the client computer system to the backup server computer system, e.g., by the client-side backup software on the client computer system communicating with the server-side backup software on the server computer system. In response to receiving the backup data from the client-side backup software, the server-side backup software may store the backup data in the storage pool 100. As discussed above, the system may utilize de-duplication techniques to ensure that files or file segments in the storage pool 100 are not duplicated. For example, before transmitting each file or file segment to the backup server computer system, the client-side backup software may communicate with the server-side backup software to determine whether the file or file segment is already stored in the storage pool. If already stored then the file or file segment may not be transmitted to the backup server computer system.

The backup tasks may be initiated in an order such that client computer systems 83 with faster transmission speeds are backed up before client computer systems 83 with slower transmission speeds. The order may be specified by the ranking of the client computer systems according to their respective transmission speeds. In general any of various algorithms may be used such that the backup tasks for a first subset (e.g., a first one or more) of the client computer systems are initiated before the backup tasks for a second subset (e.g., a second one or more) of the client computer systems in response to determining that the transmission speeds of the client computer systems in the first subset are faster than the transmission speeds of the client computer systems in the second subset.

In some embodiments the backup tasks may be performed one at a time. The backup tasks for the client computer systems may be initiated one at a time in the order of the transmission speed ranking. For example, the client computer system with the fastest transmission speed may be initiated first, and after it completes the client computer system with the second fastest transmission speed may be initiated, and so on. If categories are used to represent the transmission speeds then the backup tasks for the client computer systems assigned to the fastest category may be initiated and performed one at a time until they are all complete. The backup tasks for the client computer systems assigned to the second fastest category may then be initiated and performed one at a time until they are all complete, and so on, until all the categories are done. (Within a given category, the backup tasks for the client computer systems assigned to that category may be performed in any order.)

In other embodiments multiple backup tasks may be performed simultaneously. For example, in some embodiments an administrator of the backup server computer system 90 may interact with a user interface of the server-side backup software to specify a certain number of backup tasks to perform simultaneously. For example, if the administrator specifies to perform 50 backup tasks simultaneously then the server-side backup software may initiate the backup tasks for the 50 client computer systems with the 50 fastest transmission speeds. In response to one of these backup tasks completing, the server-side backup software may initiate the backup task for the 51st fastest client computer system to keep the number of active backup tasks at 50. In response to another one of the backup tasks completing, the server-side backup software may initiate the backup task for the 52nd fastest client computer system, and so on.

Figure 3:
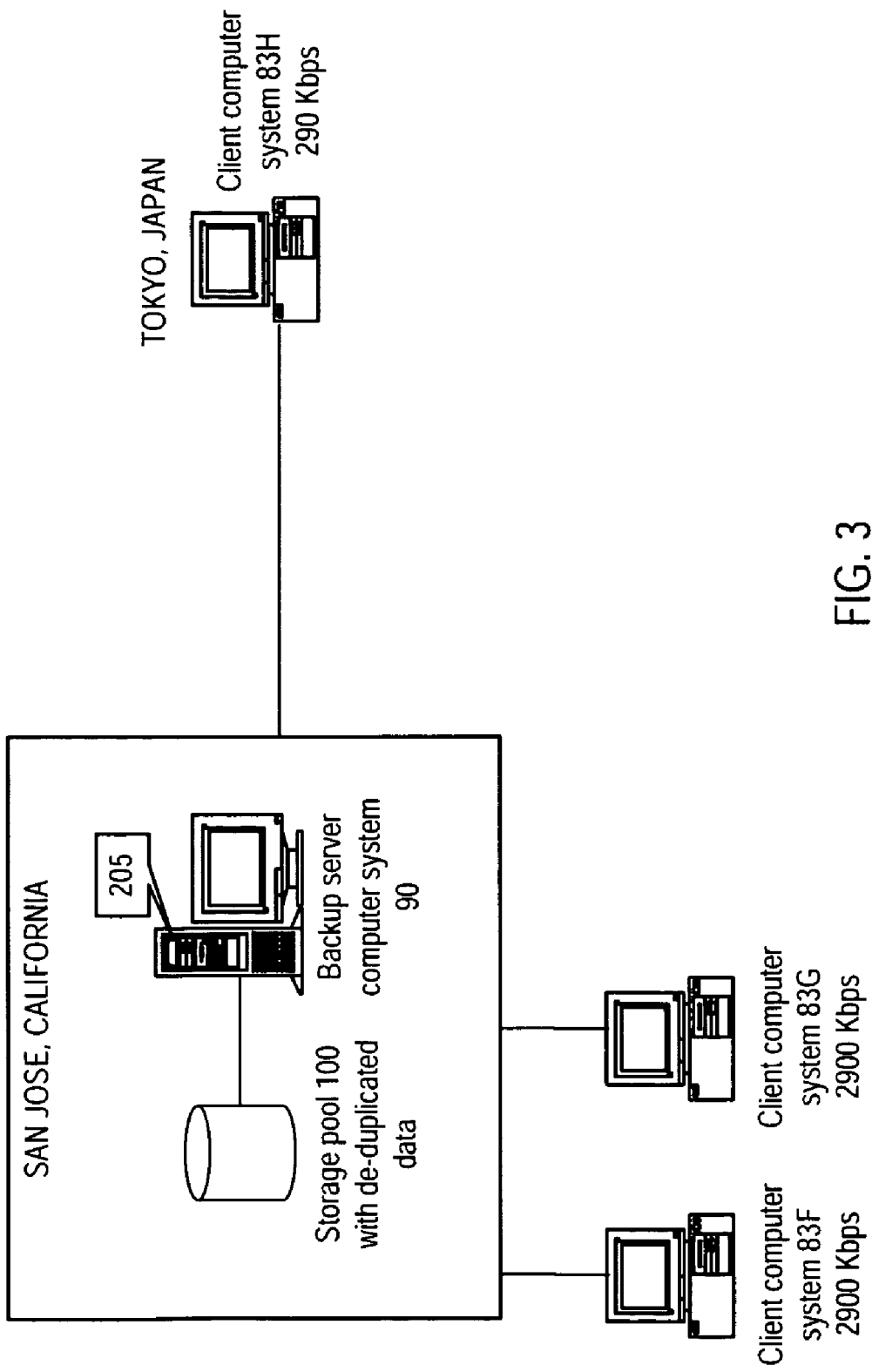
FIG. 3 illustrates a more particular embodiment of a plurality of client computer systems coupled to a backup server computer system.

In various embodiments, the method described above may reduce the amount of time necessary to backup the client computer systems. FIG. 3 illustrates an example in which the backup server computer system 90 is located in San Jose, Calif. Two client computer systems are also located in San Jose, Calif., and another is located in Tokyo, Japan. Suppose that the backup server computer system 90 has polled the client computer systems and determined their transmission rates as illustrated in FIG. 3. For illustrative purposes, suppose that the client computer system 83F in San Jose has 60% of the data of the client computer system 83H in Tokyo, and no other data. Suppose also that the client computer system 83G in San Jose has the other 40% of the data of the client computer system 83H in Tokyo, and no other data.

The amount of time that it takes to backup all of the client computer systems depends on the order in which they are backed up. For example, suppose that the client computer systems are backed up one at a time in the order of 83F, and then 83G, and then 83H. Suppose that the 83F backup task takes 1 hour to complete, and the 83G backup task takes 40 minutes to complete. The backup task for 83H may then be initiated. However, since de-duplication techniques are utilized and all of the data of 83H was already backed up during the backup operations for 83F and 83G, there is nothing that needs to be backed up from 83H. Thus, the total amount of time taken to backup the data from all of the client computer systems in this example is 1 hour and 40 minutes.

Now instead suppose that the client computer systems are backed up one at a time in the order of 83H, and then 83F, and then 83G. This time there will be nothing to backup from 83F and 83G since all of their data is duplicated on 83H. Thus, the exact same data is backed up to the backup server computer system 90 in both cases. However, since the transmission speed of 83H is 10 times slower than the transmission speeds of 83F and 83G, it may take approximately 10 times longer in the second example, e.g., 16 hours and 40 minutes.

According to the method described above, the client computer systems with fast transmission speeds are backed up before the client computer systems with slow transmission speeds. Thus, the client computer systems may be backed up either in the order 83F, 83G, 83H, or in the order 83G, 83F, 83H. The order 83H, 83F, 83G in the second example above would be avoided, which would ensure that the backup tasks are completed much faster than if this order were used. However, prior art systems that do not take the transmission speeds of the client computer systems into account when determining the order in which to backup the client computer systems may perform the backup tasks in the order 83H, 83F, 83G.

In addition to reducing the amount of time needed to backup the client computer systems, the method described above may also reduce the amount of network bandwidth used to backup the client computer systems in some embodiments. In the example of FIG. 3, much more network bandwidth may be used if the backup tasks are performed in the 83H, 83F, 83G order because 83H is much further away from the backup server computer system 90, and the data traverses many more network links to reach the backup server computer system 90. Again however, the method described above would ensure that this order is avoided, and would thus ensure a savings in the network bandwidth used to backup the client computer systems.

FIG. 3 is a simple example to illustrate the principles of time and network bandwidth savings. In a more complicated example, there may be hundreds of client computer systems, and there may be many simultaneous backup tasks being performed at once. However the principles of time and network bandwidth savings achieved by the method described herein may still apply.

In some embodiments the system may be scheduled for periodic backup according to a time schedule, such as daily, weekly, monthly, etc. Thus, the client computer systems may be backed up to the backup server computer system 90 multiple times. In some embodiments the transmission speeds of the client computer systems may be re-determined, and the ranking may be performed again each time prior to backing up the client computer systems since the relative transmission speeds of the client computer systems may change over time.

The method described above may be especially advantageous for embodiments in which there is a large amount of overlap in the data on the client computer systems. This often occurs, for example, the first time that client computer systems are backed up. For example, when the system is initially deployed, all of the operating system files of the client computer systems may need to be backed up. Since many of the client computer systems may share the same operating system, this may result in high data overlap.

Figure 4:
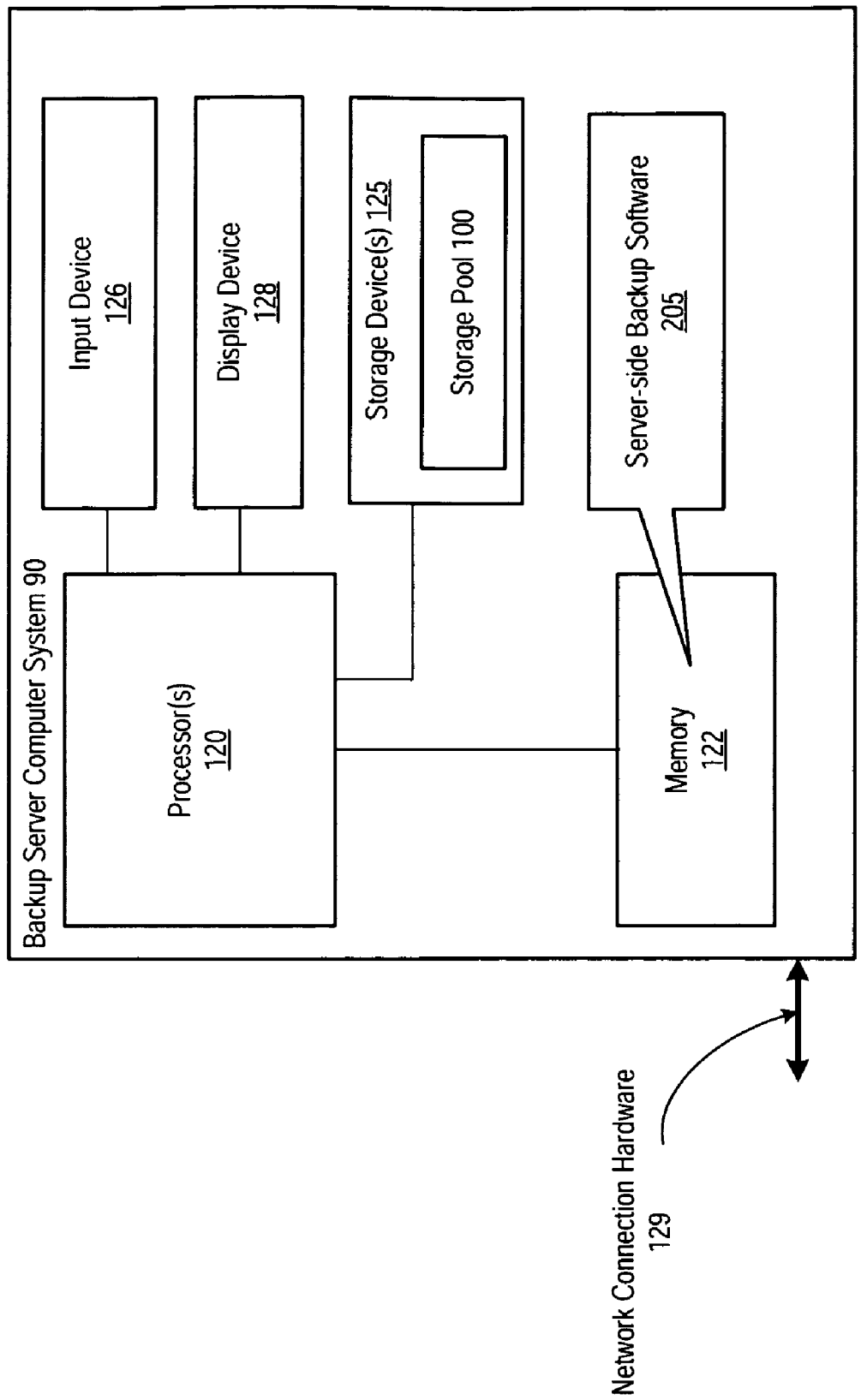
FIG. 4 illustrates an example of the backup server computer system according to one embodiment.

FIG. 4 illustrates an example of the backup server computer system 90 according to one embodiment. In various embodiments the backup server computer system 90 may include any number of server computers or nodes. Thus, the components illustrated in FIG. 4 may be implemented in one or more server computers or nodes.

The backup server computer system 90 may include one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store the server-side backup software 205, which may be executed by the processor(s) 120. The server-side backup software 205 may execute to communicate with client-side backup software executing on the client computer systems 83 to backup the client computer systems 83 according to the method described above.

It is noted that the processor 120 is representative of any type of processor. For example, in one embodiment, the processor 120 may be compatible with the x86 architecture, while in another embodiment the processor 120 may be compatible with the SPARC™ family of processors. Also, in some embodiments the backup server computer system 90 may include multiple processors 120.

The backup server computer system 90 also includes one or more storage devices 125. The storage pool 100 in which the backup data received from the client computer systems 83 is stored may be implemented on one or more of the storage devices 125. For example, in some embodiments the storage pool 100 may be a storage area contained within a single storage device 125. In other embodiments the storage pool 100 may include storage areas of a plurality of storage devices 125.

In various embodiments the storage devices 125 may include any of various kinds of storage devices. Examples of storage devices include disk storage units (e.g., devices including one or more disk drives), tape drives (e.g., devices operable to store data on tape cartridges), optical storage devices (e.g., devices operable to store data on optical media), flash memory storage devices, etc.

The backup server computer system 90 may also include one or more input devices 126 for receiving user input, e.g., to the server-side backup software 205 or other programs executing on the backup server computer system 90. The input device(s) 126 may include any of various types of input devices, such as keyboards, keypads, microphones, or pointing devices (e.g., a mouse or trackball). The backup server computer system 90 may also include one or more output devices 128 for displaying output, e.g., a graphical user interface of the server-side backup software 205 or other programs executing on the backup server computer system 90. The output device(s) 128 may include any of various types of output devices, such as LCD screens or monitors, CRT monitors, etc.

The backup server computer system 90 may also include network connection hardware 129 through which the backup server computer system 90 couples to one or more networks enabling communication with the client computer systems 83. The network connection 129 may include any type of hardware for coupling the backup server computer system 90 to a network, e.g., depending on the type of network. In various embodiments, the backup server computer system 90 may be coupled to the client computer systems 83 via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 5:
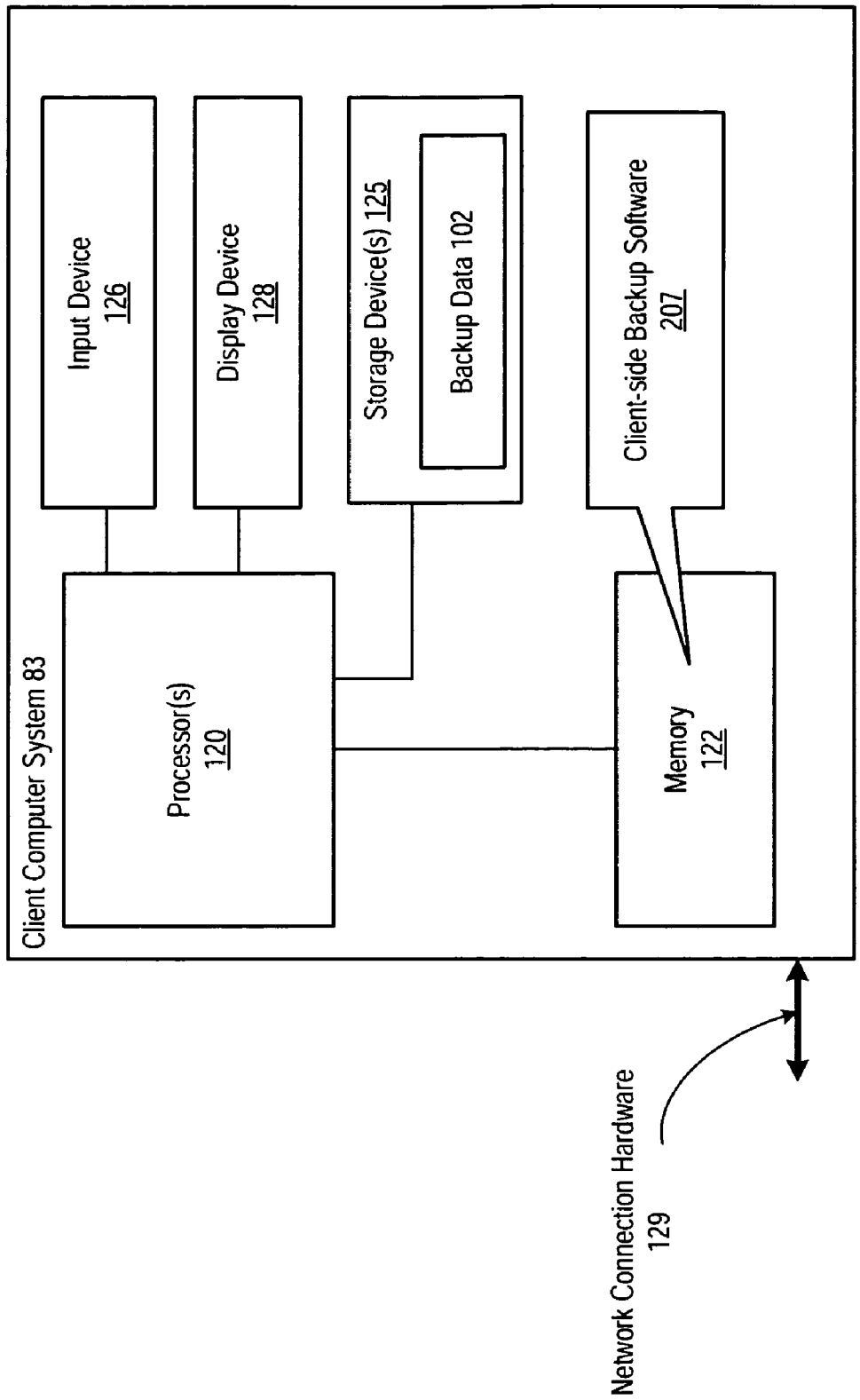
FIG. 5 illustrates an example of a client computer system according to one embodiment.

FIG. 5 illustrates an example of a client computer system 83 according to one embodiment. In various embodiments the client computer system 83 may include any number of client computers or nodes. Thus, the components illustrated in FIG. 4 may be implemented in one or more client computers or nodes.

The client computer system 83 may include one or more processors 120 coupled to memory 122. The memory 122 may store program instructions and/or data. In particular, the memory 122 may store the client-side backup software 207, which may be executed by the processor(s) 120.

The client computer system 83 also includes one or more storage devices 125 on which the data to be backed up to the backup server computer system 90 is stored. In various embodiments the storage devices 125 may include any of various kinds of storage devices.

The client computer system 83 may also include one or more input devices 126 for receiving user input and one or more output devices 128 for displaying output.

The client computer system 83 may also include network connection hardware 129 through which the client computer system 83 couples to one or more networks enabling communication with the backup server computer system 90. The network connection hardware 129 may include any type of hardware for coupling the client computer system 83 to a network, e.g., depending on the type of network.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
   for each client computer system of a plurality of client computer systems, determine a transmission speed at which the client computer system can transmit backup data to a backup server computer system, wherein determining the transmission speed comprises determining a speed of data transmission across a network coupling the client computer system to the backup server computer system, wherein determining the speed of data transmission comprises polling the client computer system to determine the speed of data transmission;
   rank the client computer systems according to their respective transmission speeds; and
   initiate a respective backup task for each client computer system of the plurality of client computer systems, wherein the respective backup task for each client computer system operates to transmit backup data from the client computer system to the backup server computer system;
   wherein initiating the backup tasks for the plurality of client computer systems comprises initiating the backup tasks for a first subset of the plurality of client computer systems before initiating the backup tasks for a second subset of the plurality of client computer systems in response to determining that the transmission speeds of the client computer systems in the first subset are faster than the transmission speeds of the client computer systems in the second subset.

2. The computer-accessible storage medium of claim 1, wherein determining the transmission speed at which each client computer system can transmit backup data to the backup server computer system comprises determining an actual speed of data transmission from the client computer system to the backup server computer system.

3. The computer-accessible storage medium of claim 1, wherein determining the transmission speed at which each client computer system can transmit backup data to the backup server computer system comprises estimating the transmission speed.

4. The computer-accessible storage medium of claim 1, wherein for each client computer system of the plurality of client computer systems, the transmission speed for the client computer system is estimated at a particular time based on current usage of one or more resources of the client computer system at the particular time.

5. The computer-accessible storage medium of claim 4, wherein estimating the transmission speed based on the current usage of the one or more resources of the client computer system comprises estimating the transmission speed based on the current usage of one or more of:
   one or more processors of the client computer system;
   memory of the client computer system.

6. The computer-accessible storage medium of claim 1, wherein determining the transmission speed at which each client computer system can transmit backup data to the backup server computer system comprises assigning each client computer system to one of a plurality of categories representing relative transmission speeds.

7. The computer-accessible storage medium of claim 1, wherein initiating the backup tasks for the plurality of client computer systems comprises initiating the backup tasks in an order specified by the ranking of the client computer systems according to their respective transmission speeds.

8. The computer-accessible storage medium of claim 1, wherein the program instructions are further executable to:
   select the client computer systems in the first subset as the N client computer systems with the fastest transmission speeds, wherein N is an integer.

9. The computer-accessible storage medium of claim 1, wherein the program instructions are further executable to:
   store the backup data on the backup server computer system in response to receiving the backup data from the client computer systems.

10. The computer-accessible storage medium of claim 9, wherein storing the backup data on the backup server computer system comprises de-duplicating the backup data to avoid storing multiple copies of identical data on the backup server computer system.

11. A system comprising:
    one or more processors; and
    memory storing program instructions;
    wherein the program instructions are executable by the one or more processors to implement:
    for each client computer system of a plurality of client computer systems, determine a transmission speed at which the client computer system can transmit backup data to a backup server computer system, wherein determining the transmission speed comprises determining a speed of data transmission across a network coupling the client computer system to the backup server computer system, wherein determining the speed of data transmission comprises polling the client computer system to determine the speed of data transmission;

rank the client computer systems according to their respective transmission speeds; and initiate a respective backup task for each client computer system of the plurality of client computer systems, wherein the respective backup task for each client computer system operates to transmit backup data from the client computer system to the backup server computer system;

wherein initiating the backup tasks for the plurality of client computer systems comprises initiating the backup tasks for a first subset of the plurality of client computer systems before initiating the backup tasks for a second subset of the plurality of client computer systems in response to determining that the transmission speeds of the client computer systems in the first subset are faster than the transmission speeds of the client computer systems in the second subset.

12. The system of claim 11, wherein initiating the backup tasks for the plurality of client computer systems comprises initiating the backup tasks in an order specified by the ranking of the client computer systems according to their respective transmission speeds.

13. The system of claim 11, wherein the program instructions are further executable by the one or more processors to implement:

select the client computer systems in the first subset as the N client computer systems with the fastest transmission speeds, wherein N is an integer.

14. A method comprising:

for each client computer system of a plurality of client computer systems, determining a transmission speed at which the client computer system can transmit backup data to a backup server computer system, wherein determining the transmission speed comprises determining a speed of data transmission across a network coupling the client computer system to the backup server computer system, wherein determining the speed of data transmission comprises polling the client computer system to determine the speed of data transmission;

ranking the client computer systems according to their respective transmission speeds; and initiating a respective backup task for each client computer system of the plurality of client computer systems, wherein the respective backup task for each client computer system operates to transmit backup data from the client computer system to the backup server computer system;

wherein initiating the backup tasks for the plurality of client computer systems comprises initiating the backup tasks for a first subset of the plurality of client computer systems before initiating the backup tasks for a second subset of the plurality of client computer systems in response to determining that the transmission speeds of the client computer systems in the first subset are faster than the transmission speeds of the client computer systems in the second subset.

15. The method of claim 14, wherein initiating the backup tasks for the plurality of client computer systems comprises initiating the backup tasks in an order specified by the ranking of the client computer systems according to their respective transmission speeds.

16. The method of claim 14, further comprising:

selecting the client computer systems in the first subset as the N client computer systems with the fastest transmission speeds, wherein N is an integer.

* * * * *